(12) United States Patent
Ueki

(10) Patent No.: US 8,258,046 B2
(45) Date of Patent: Sep. 4, 2012

(54) LASER PROCESSING METHOD FOR WORKPIECE

(75) Inventor: Atsushi Ueki, Ota-Ku (JP)

(73) Assignee: Disco Corporation, Tokyo (JP)

( * ) Notice: Subject to any disclaimer, the term of this patent is extended or adjusted under 35 U.S.C. 154(b) by 251 days.

(21) Appl. No.: 12/874,344

(22) Filed: Sep. 2, 2010

(65) Prior Publication Data

US 2011/0056922 A1 Mar. 10, 2011

(30) Foreign Application Priority Data

Sep. 10, 2009 (JP) .................................. 2009-209765

(51) Int. Cl.
*H01L 21/78* (2006.01)
*H01L 21/301* (2006.01)

(52) U.S. Cl. ...................... 438/463; 156/248; 156/272.8; 257/E21.599

(58) Field of Classification Search .................. 438/460, 438/463; 219/121.68, 121.69; 156/272.8, 156/248; 257/E21.599
See application file for complete search history.

(56) References Cited

U.S. PATENT DOCUMENTS 7,968,432 B2 * 6/2011 Tamura et al. ................ 438/463

FOREIGN PATENT DOCUMENTS

| JP | 2002-192370 | 7/2002 |
| JP | 2005-332841 | 12/2005 |
| JP | 2006-171530 | 6/2006 |

* cited by examiner

*Primary Examiner* — Samuel M Heinrich
(74) *Attorney, Agent, or Firm* — Greer, Burns & Crain, Ltd.

(57) ABSTRACT

A processing method for a workpiece which includes a first modified region forming step of forming first modified regions along first division lines and second division lines near the front side of the workpiece, a second modified region forming step of forming second modified regions at intersecting regions between the first division lines and the second division lines at predetermined positions between the back side of the workpiece and the first modified regions formed in the workpiece by performing the first modified region forming step, and a dividing step of applying an external force to the workpiece after performing the first and second modified region forming steps to thereby divide the workpiece along the first division lines and the second division lines into individual chips.

3 Claims, 18 Drawing Sheets

FIG.25

| NUMBER OF DROPS UNTIL BREAKAGE | EXAMPLE | COMPARISON |
|---|---|---|
| 0 ~ 10 | 11% | 100% |
| 11 ~ 20 | 15% | 0% |
| 21 ~ 30 | 0% | 0% |
| NOT BROKEN | 74% | 0% |

LASER PROCESSING METHOD FOR WORKPIECE

BACKGROUND OF THE INVENTION

1. Field of the Invention

The present invention relates to a laser processing method for processing a workpiece such as a semiconductor wafer.

2. Description of the Related Art

In a semiconductor device fabrication process, a plurality of first division lines and a plurality of second division lines intersecting the first division lines are formed on the front side of a platelike workpiece such as a semiconductor wafer to thereby partition a plurality of regions where a plurality of functional devices are respectively formed. The workpiece thus formed with the functional devices is divided along the first division lines and the second division lines to thereby produce a plurality of individual chips.

As a method of dividing the workpiece along the first division lines and the second division lines, a laser processing method is known, wherein a pulse-shaped processing laser beam (pulsed laser beam) in an infrared region having a transmission wavelength to the workpiece is used and this pulsed laser beam is applied to the workpiece so as to be focused inside the workpiece (see Japanese Patent No. 3408805 and Japanese Patent Laid-open No. 2005-332841, for example). In this dividing method using laser processing, the pulsed laser beam is applied by laser applying means from one side of the workpiece so as to be focused inside the workpiece, thereby continuously forming a modified region inside the workpiece along each division line. Thereafter, an external force is applied to the workpiece to thereby break the workpiece along each division line where the strength of the workpiece has been reduced by the formation of the modified region, thus dividing the workpiece into a plurality of individual chips.

Further, Japanese Patent Laid-open No. 2006-171530 discloses a technique such that a plurality of first modified regions (modified layers) are formed along the first and second division lines in a workpiece at its central portion in the direction of the thickness of the workpiece and that a plurality of second modified regions thicker than the first modified regions are formed at a plurality of intersecting regions between the first division lines and the second division lines, thereby preventing a reduction in die strength of each chip divided from the workpiece.

SUMMARY OF THE INVENTION

In the technique disclosed in Japanese Patent Laid-open No. 2006-171530, however, the first modified regions extending along the first and second division lines formed on the front side of the workpiece are formed at the central portion of the workpiece in the direction of the thickness of the workpiece. Accordingly, there is a possibility that the break of the workpiece starting from the modified regions may proceed obliquely to deviate from the division lines.

It is therefore an object of the present invention to provide a laser processing method which can accurately divide the workpiece along each division line.

In accordance with an aspect of the present invention, there is provided a processing method for dividing a workpiece along a plurality of first division lines and a plurality of second division lines intersecting the first division lines, the front side of the workpiece being partitioned by the first division lines and the second division lines into a plurality of regions where a plurality of functional devices are respectively formed, the processing method including a first modified region forming step of applying a pulsed laser beam having a transmission wavelength to the workpiece along the first division lines and the second division lines to thereby form a plurality of first modified regions in the workpiece near the front side of the workpiece; a second modified region forming step of applying the pulsed laser beam to a plurality of intersecting regions between the first division lines and the second division lines to thereby form a plurality of second modified regions at predetermined positions between the back side of the workpiece and the first modified regions formed or to be formed in the workpiece; and a dividing step of applying an external force to the workpiece after performing the first modified region forming step and the second modified region forming step to thereby divide the workpiece along the first division lines and the second division lines into a plurality of individual chips.

Preferably, the processing method according to the present invention further includes a protective tape attaching step of attaching an expandable protective tape to the front side of the workpiece before performing the dividing step; the dividing step including the step of expanding the protective tape attached to the front side of the workpiece to thereby apply the external force to the workpiece, thus dividing the workpiece along the first division lines and the second division lines.

Preferably, the processing method according to the present invention further includes a protective tape attaching step of attaching a protective tape to the back side of the workpiece; the dividing step including the step of bending the workpiece toward the back side thereof attached to the protective tape to thereby apply the external force to the workpiece, thus dividing the workpiece along the first division lines and the second division lines.

According to the present invention, the first modified regions extending along the first division lines and the second division lines partitioning the front side of the workpiece into the plural regions where the plural functional devices are respectively formed are formed in the workpiece near the front side thereof. Accordingly, the workpiece can be broken from the first modified regions as break starting regions along the first division lines and the second division lines, so that the workpiece can be accurately divided along the first division lines and the second division lines.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 25 is a table showing the result of the test performed by the test method shown in FIG. 24.

DETAILED DESCRIPTION OF THE PREFERRED EMBODIMENTS

There will now be described a processing method according to a preferred embodiment of the present invention and a semiconductor device manufacturing method including this processing method with reference to the drawings.

First Preferred Embodiment

Figure 1:
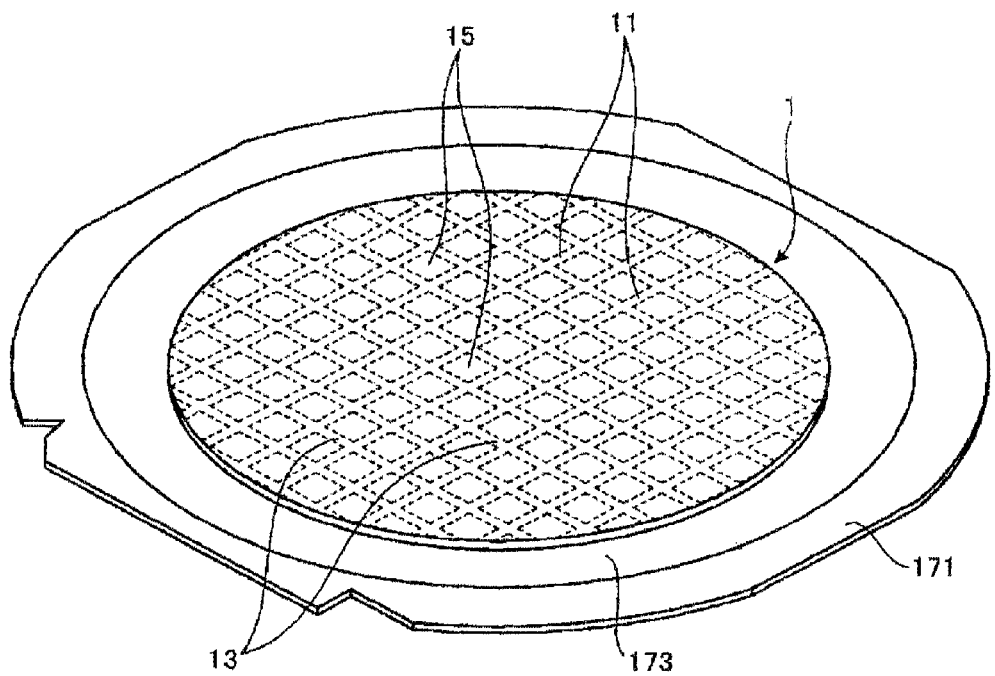
FIG. 1 is a perspective view of a workpiece according to a first preferred embodiment of the present invention.
Figure 2:
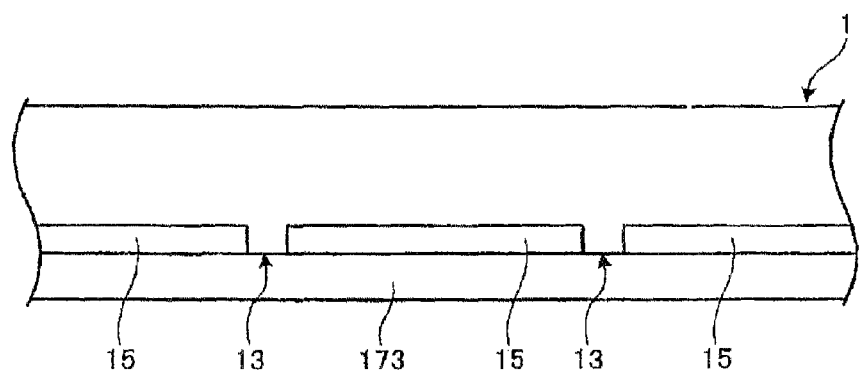
FIG. 2 is a sectional view showing the internal structure of the workpiece according to the first preferred embodiment.

A workpiece to be processed by a processing method according to a first preferred embodiment of the present invention will now be described. FIG. 1 is a perspective view of a workpiece 1 according to the first preferred embodiment, and FIG. 2 is a sectional view showing the internal structure of the workpiece 1 according to the first preferred embodiment. As shown in FIG. 1, the workpiece 1 is a disk-shaped member, and the front side of the workpiece 1 is formed with a plurality of first division lines 11 and a plurality of second division lines 13 intersecting the first division lines 11 at right angles thereto, thereby partitioning a plurality of rectangular regions where a plurality of functional devices 15 are respectively formed. As shown in FIGS. 1 and 2, the workpiece 1 is handled in the condition where it is supported to an annular frame 171 through a protective tape 173 formed from an expandable synthetic resin sheet in performing the processing method according to the first preferred embodiment. More specifically, the annular frame 171 has an inner opening, and the protective tape 173 is supported at its outer circumferential portion to the annular frame 171 so as to close the inner opening of the annular frame 171. The front side of the workpiece 1 is attached to the upper surface (adhesive surface) of the protective tape 173 supported to the annular frame 171. In the following description, the first division lines 11 and the second division lines 13 will be suitably referred to simply as "division lines 11 and 13."

The workpiece 1 is not especially limited. Examples of the workpiece 1 include a semiconductor wafer such as a silicon wafer, an inorganic material substrate of ceramic, glass, sapphire ($Al_2O_3$), etc., and various work materials required to achieve a processing positional accuracy on the order of micrometers.

Figure 3:
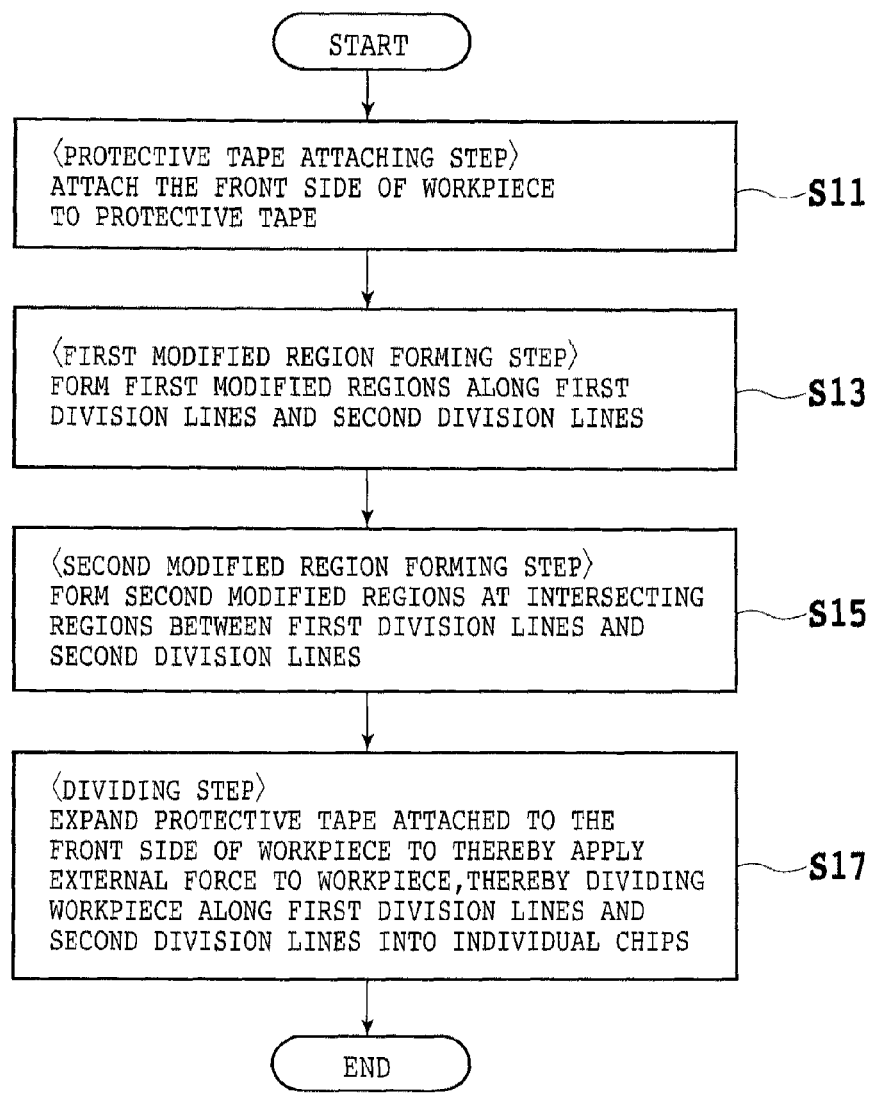
FIG. 3 is a flowchart showing the procedure of a processing method according to the first preferred embodiment.

The processing method for laser-processing the workpiece 1 will now be described. FIG. 3 is a flowchart showing the procedure of the processing method according to the first preferred embodiment. As shown in FIG. 3, a protective tape attaching step is first performed to attach the front side of the workpiece 1 to the protective tape 173 supported at its outer circumferential portion to the annular frame 171 so as to close the inner opening of the annular frame 171 as shown in FIG. 1 (step S11). Thereafter, a first modified region forming step is performed to form a plurality of first modified regions along the first division lines 11 and the second division lines 13 (step S13). Thereafter, a second modified region forming step is performed to form a plurality of second modified regions near the points of intersection (at intersecting regions) between the first division lines 11 and the second division lines 13 (step S15). Thereafter, a dividing step is performed to expand the protective tape 173 attached to the front side of the workpiece 1, thereby applying an external force to the workpiece 1 to divide the workpiece 1 into individual chips along the division lines 11 and 13 where the strength has been reduced by the formation of the first modified regions and the second modified regions (step S17).

The modified region mentioned above means a region different from the previous region before processing in density, refractive index, mechanical strength, or any other physical properties. Examples of the modified region include a melted region, cracked region, breakdown region, refractive index changed region, and mixed region thereof.

The first modified region forming step, the second modified region forming step, and the dividing step respectively corresponding to steps S13, S15, and S17 will now be described in this order. First, the first modified region forming step and the second modified region forming step will be described. These steps are performed by a processing apparatus for applying a pulse-shaped processing laser beam (pulsed laser beam) to the workpiece 1 to thereby process the workpiece 1.

Figure 4:
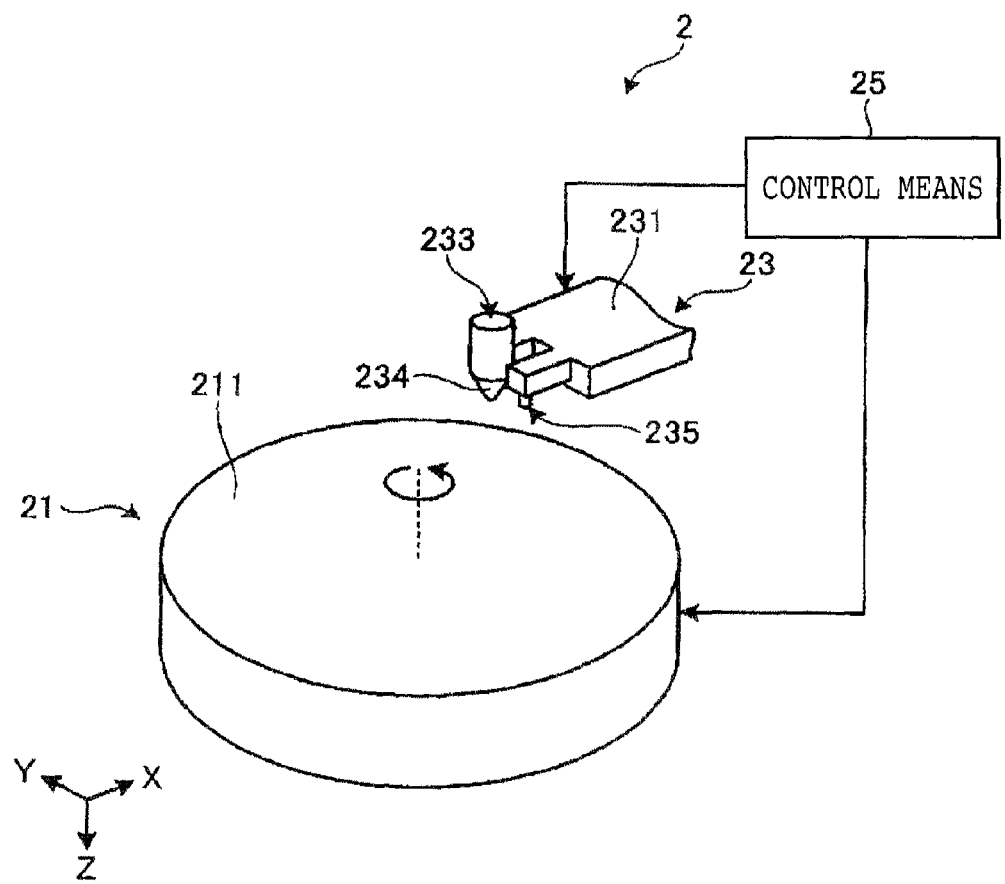
FIG. 4 is a schematic perspective view for illustrating the configuration of a processing apparatus.

The configuration of this processing apparatus will now be described. FIG. 4 is a schematic perspective view for illustrating the configuration of a processing apparatus 2. As shown in FIG. 4, the processing apparatus 2 includes holding means 21, laser processing means 23, and control means 25 for controlling the operation of the holding means 21 and the laser processing means 23. The holding means 21 primarily includes a chuck table having a size corresponding to the size of the workpiece 1. The holding means 21 has a holding surface 211 parallel to an XY coordinate plane. Although not shown, the holding means 21 has clamps provided on the outer circumference of the holding surface 211 for fixing the annular frame 171. As shown in FIG. 1, the workpiece 1 is supported to the annular frame 171 in the condition where the front side of the workpiece 1 is attached to the protective tape 173. The workpiece 1 thus supported through the protective tape 173 to the annular frame 171 is carried to the holding means 21 and held on the holding surface 211 in the condition where the protective tape 173 is in contact with the holding surface 211 and the back side of the workpiece 1 is exposed (oriented upward). The holding means 21 having the holding surface 211 for holding the workpiece 1 thereon is movable both in an X coordinate direction and in a Y coordinate direction by driving means (not shown). This driving means is controlled by the control means 25 to move the holding means 21 to a predetermined X position, thus feeding the holding means 21 in the X coordinate direction and to also move the holding means 21 to a predetermined Y position, thus indexing the holding means 21 in the Y coordinate direction. Further, the holding means 21 is rotatable about a vertical axis passing through the center of the holding surface 211 by rotationally driving means (not shown).

The laser processing means 23 functions to laser-process the workpiece 1 held on the holding surface 211. The laser processing means 23 includes a supporting member 231, a laser applying unit 233 mounted on the supporting member 231, and an imaging unit 235 mounted on the supporting member 231 so that the positional relation between the imaging unit 235 and the laser applying unit 233 is fixed. The laser applying unit 233 functions to apply a pulsed laser beam to the workpiece 1 held on the holding surface 211 from the back side of the workpiece 1. The laser applying unit 233 includes focusing means 234 located at the lower end so as to be opposed to the back side of the workpiece 1 held on the holding surface 211. Although not shown, the supporting member 231 contains laser beam oscillating means and a light transmitting system. The laser applying unit 233 cooperates with the laser beam oscillating means and the light transmitting system to apply a pulsed laser beam to the back side of the workpiece 1 positioned below the focusing means 234. The focusing means 234 includes an optical system having a focusing lens for focusing a pulsed laser beam oscillated by the laser beam oscillating means toward the workpiece 1 held on the holding surface 211 and a mirror for reflecting a pulsed laser beam from the laser beam oscillating means toward the workpiece 1 held on the holding surface 211. The laser beam oscillating means functions to oscillate a pulsed laser beam having a predetermined transmission wavelength (e.g., 1064 nm) to the workpiece 1 held on the holding surface 211. For example, the laser beam oscillating means is provided by a laser beam oscillator such as a YAG laser oscillator and a YVO4 laser oscillator.

The imaging unit 235 functions to perform alignment for aligning the laser processing position on the workpiece 1 (the transversely central position on each of the division lines 11 and 13) to the position directly below the focusing means 234. For example, the imaging unit 235 is composed of a microscope structure (not shown) including an objective lens opposed to the workpiece 1 held on the holding surface 211 and a camera (not shown) for picking up an enlarged image of the workpiece 1 observed by the microscope structure. Thus, the workpiece 1 held on the holding surface 211 is imaged and image data obtained is output to the control means 25.

The supporting member 231 for supporting the laser applying unit 233 and the imaging unit 235 is movable in a Z coordinate direction perpendicular to the XY coordinate plane by driving means (not shown). This driving means is controlled by the control means 25 to move the supporting member 231 to a predetermined Z position in the Z coordinate direction. Accordingly, the focusing lens in the focusing means 234 can be moved perpendicularly to the holding surface 211, thereby adjusting the position (Z position) of the focal point of the pulsed laser beam focused by the focusing lens.

While the holding means 21 is movable in the XY coordinate plane and the supporting member 231 is movable in the Z coordinate direction in this preferred embodiment, it is sufficient that the holding means 21 and the supporting member 231 may be relatively movable in the X, Y, and Z coordinate directions. It may be suitably set which of the holding means 21 and the supporting member 231 is to be moved in the X, Y, and Z coordinate directions. Further, both of the holding means 21 and the supporting member 231 may be moved in the X, Y, and Z coordinate directions.

The control means 25 is provided by a microcomputer including a memory storing various data required for the operation of the processing apparatus 2. The control means 25 controls the operation of various components of the processing apparatus 2 to centrally control the processing apparatus 2. More specifically, the control means 25 controls the operation of each component of the processing apparatus 2 to perform the first modified region forming step and the second modified region forming step.

<First Modified Region Forming Step>

Figure 5:
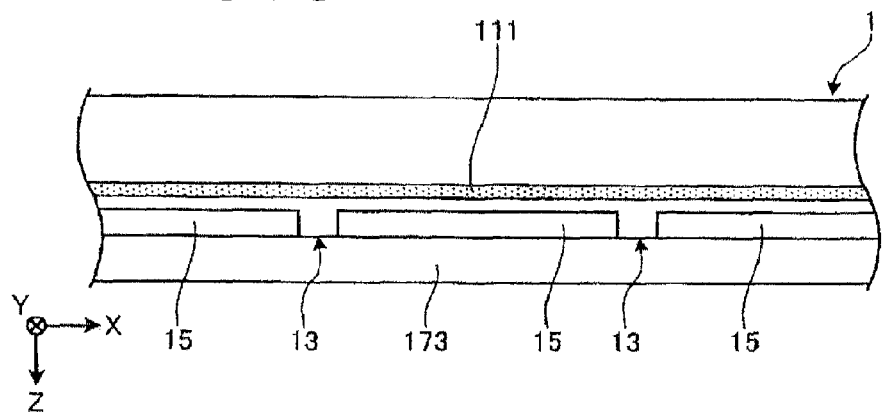
FIG. 5 is a sectional view for illustrating a first modified region forming step according to the first preferred embodiment.
Figure 6:
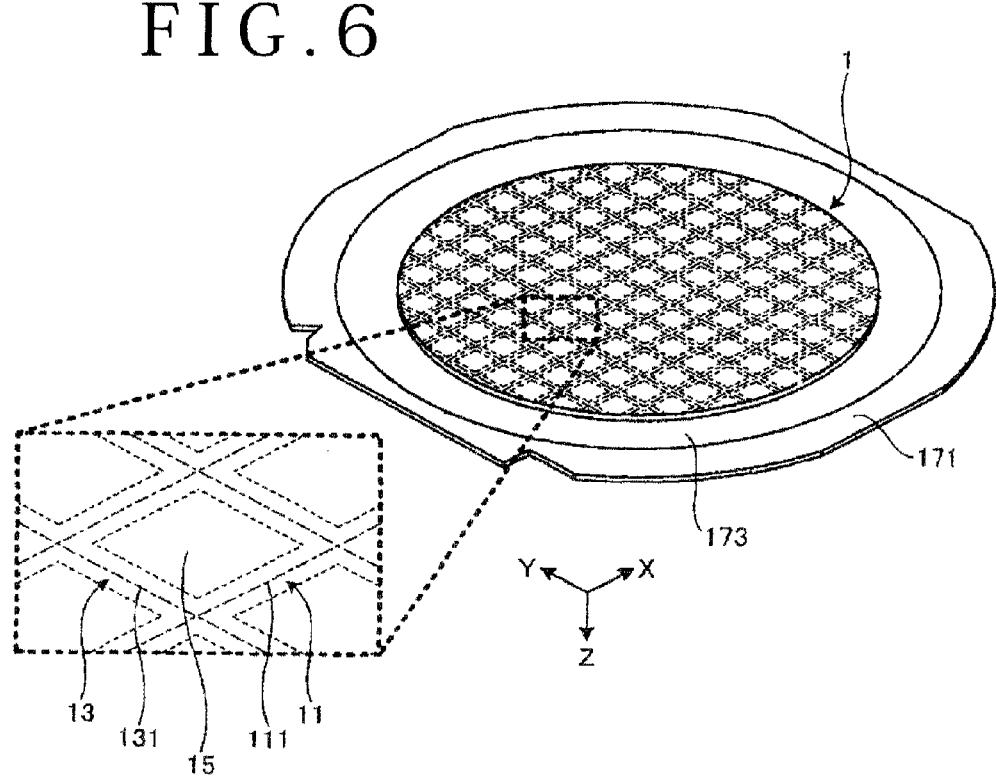
FIG. 6 is a perspective view for illustrating the first modified region forming step according to the first preferred embodiment.

FIGS. 5 and 6 illustrate the first modified region forming step according to the first preferred embodiment performed by using the processing apparatus 2 mentioned above. More specifically, FIG. 5 is a sectional view as viewed in the Y coordinate direction, showing the internal structure of the workpiece 1 held on the holding surface 211 after performing the first modified region forming step, and FIG. 6 is a perspective view of the workpiece 1 held on the holding surface 211 after performing the first modified region forming step.

Prior to performing the first modified region forming step, the workpiece 1 is carried to the holding means 21 by carrying means (not shown) and is next held on the holding surface 211 under suction. Thereafter, the holding means 21 is moved in the XY coordinate plane to position the workpiece 1 held on the holding surface 211 directly below the imaging unit 235, and the workpiece 1 held on the holding surface 211 is imaged by the imaging unit 235 to perform the alignment. More specifically, the camera in the imaging unit 235 according to the first preferred embodiment is provided by an infrared camera which can image the front side of the workpiece 1 by transmitting infrared radiation through the workpiece 1 from the back side thereof. The image data obtained by the camera is subjected to image processing such as pattern matching. According to the result of this image processing, the holding means 21 is rotated to adjust the orientation of the workpiece 1 held on the holding surface 211 so that the first division lines 11 extend in the X coordinate direction and the second division lines 13 extend in the Y coordinate direction. Further, the transversely central position (in the Y coordinate direction) on the first division line 11 as a region to be laser-processed is detected and the holding means 21 is moved in the XY coordinate plane to align the transversely central position of this first division line 11 to the position directly below the imaging unit 235. Thereafter, the holding means 21 is shifted in the Y coordinate direction by the distance between the laser applying unit 233 and the imaging unit 235 to thereby align the transversely central position on this first division line 11 to the position directly below the focusing means 234.

After aligning the transversely central position on the first division line 11 as a target to be processed to the position directly below the focusing means 234 as mentioned above, the processing apparatus 2 operates to form a first modified region 111 along this target first division line 11 as shown in FIG. 5. The first modified line 111 is formed at a predetermined position in the workpiece 1 near the front side thereof (near the front side of the workpiece 1 where the functional devices 15 are formed). This predetermined position near the front side of the workpiece 1 will be hereinafter referred to as "first forming position." First, the supporting member 231 is moved to a predetermined Z position so that the focal position of the pulsed laser beam coincides with the first forming position to thereby adjust the focal point of the focusing lens of the focusing means 234 to the first forming position inside the workpiece 1. In this condition, the laser applying unit 233 is operated to apply the pulsed laser beam to the workpiece 1 as moving the holding means 21 in the X coordinate direction. As a result, the pulsed laser beam is focused at the first forming position to form the first modified region 111 along the target first division line 11 inside the workpiece 1 near the front side thereof where the functional devices 15 are formed as shown in FIG. 5. The distance from the front side of the workpiece 1 (the lower surface as viewed in FIG. 5) to the first modified region 111 (the first forming position) is set to preferably 5 to 30 μm, more preferably 10 to 25 μm.

Thereafter, the holding means 21 is indexed in the Y coordinate direction to align the transversely central position on the next target first division line 11 adjacent to the previous first division line 11 to the position directly below the focusing means 234, and the pulsed laser beam is similarly applied along this target first division line 11 to form another first modified region 111. In this manner, a plurality of first modified regions 111 are formed along all of the first division lines 11. Thereafter, the holding means 21 is rotated 90° to change the orientation of the workpiece 1 so that the second division lines 13 extend in the X coordinate direction. In this condition, alignment is performed as in the case of the first division lines 11. Thereafter, the transversely central position on each second division line 13 is aligned to the position directly below the focusing means 234, and the pulsed laser beam is similarly applied along each second division line 13 to form a plurality of second modified regions 131 along all of the second division lines 13. As a result, as shown by single dot & dash lines in FIG. 6, the first modified regions 111 are formed along the first division lines 11 near the front side of the workpiece 1 where the functional devices 15 are formed, and the first modified regions 131 are formed along the second division lines 13 near the front side of the workpiece 1 where the functional devices 15 are formed.

<Second Modified Region Forming Step>

Figure 7:
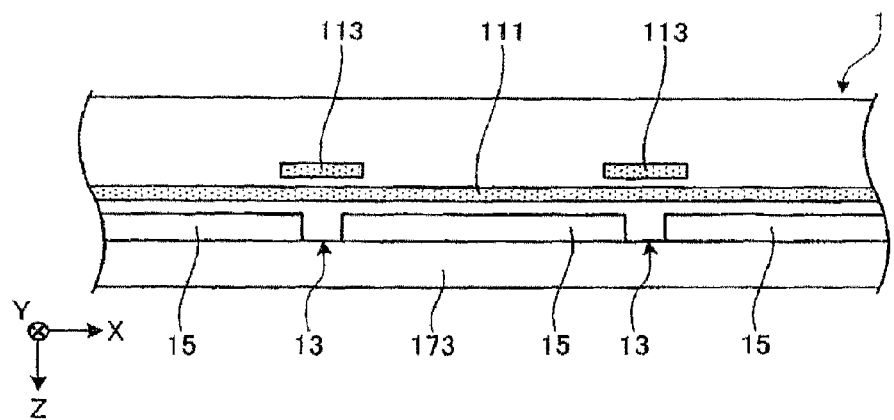
FIG. 7 is a sectional view for illustrating a second modified region forming step according to the first preferred embodiment.
Figure 8:
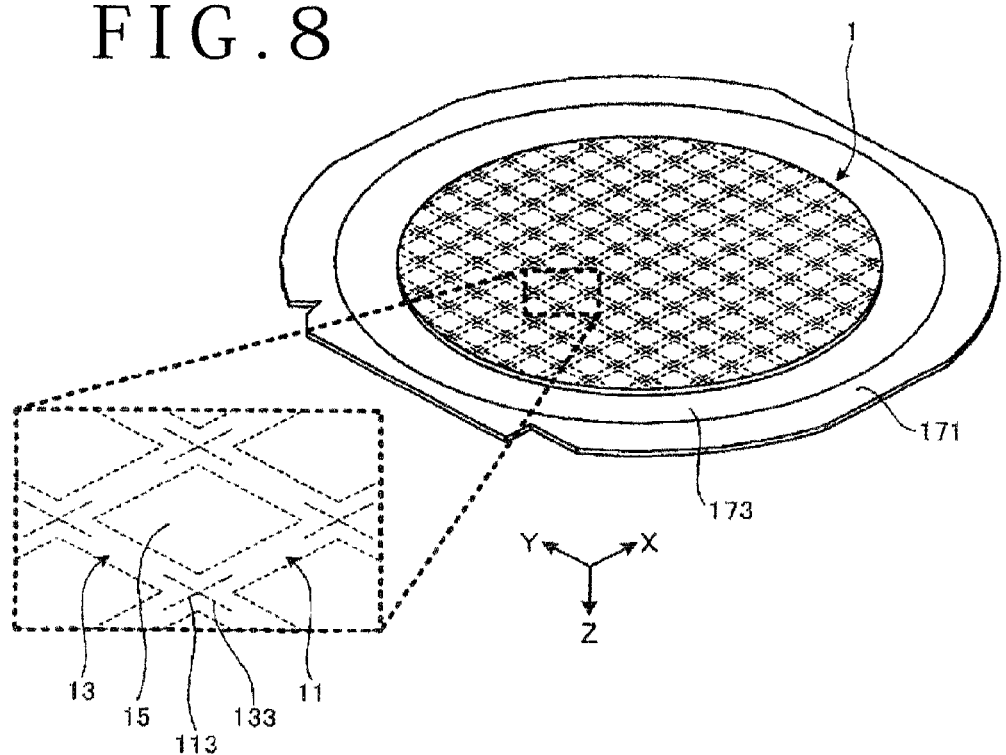
FIG. 8 is a perspective view for illustrating the second modified region forming step according to the first preferred embodiment.

FIGS. 7 and 8 illustrate the second modified region forming step according to the first preferred embodiment performed by using the processing apparatus 2 mentioned above. More specifically, FIG. 7 is a sectional view as viewed in the Y coordinate direction, showing the internal structure of the workpiece 1 held on the holding surface 211 after performing the second modified region forming step, and FIG. 8 is a perspective view of the workpiece 1 held on the holding surface 211 after performing the second modified region forming step.

The processing apparatus 2 performs alignment to align the transversely central position on the target first division line 11 to the position directly below the focusing means 234. Thereafter, a plurality of second modified regions 113 are formed along the target first division line 11 so as to be arranged at given intervals as shown in FIG. 7. These plural second modified regions 113 are formed at a predetermined position in the workpiece 1 above the corresponding first modified region 111 (toward the back side of the workpiece 1) in the intersecting regions between this target first division line 11 and the second division lines 13. This predetermined position above the corresponding first modified region 111 in the workpiece 1 will be hereinafter referred to as "second forming position." First, the supporting member 231 is moved to a predetermined Z position so that the focal position of the pulsed laser beam coincides with the second forming position to thereby adjust the focal point of the focusing lens of the focusing means 234 to the second forming position inside the workpiece 1. In this condition, the laser applying unit 233 is operated to apply the pulsed laser beam to the intersecting regions between this target first division line 11 and the second division lines 13 as moving the holding means 21 in the X coordinate direction. As a result, the pulsed laser beam is focused at the second forming position to form the second modified regions 113 along the target first division line 11 inside the workpiece 1 at the second forming position between the back side of the workpiece 1 and the corresponding first modified region 111 at the intersecting regions between the target first division line 11 and the second division lines 13.

Figure 9:
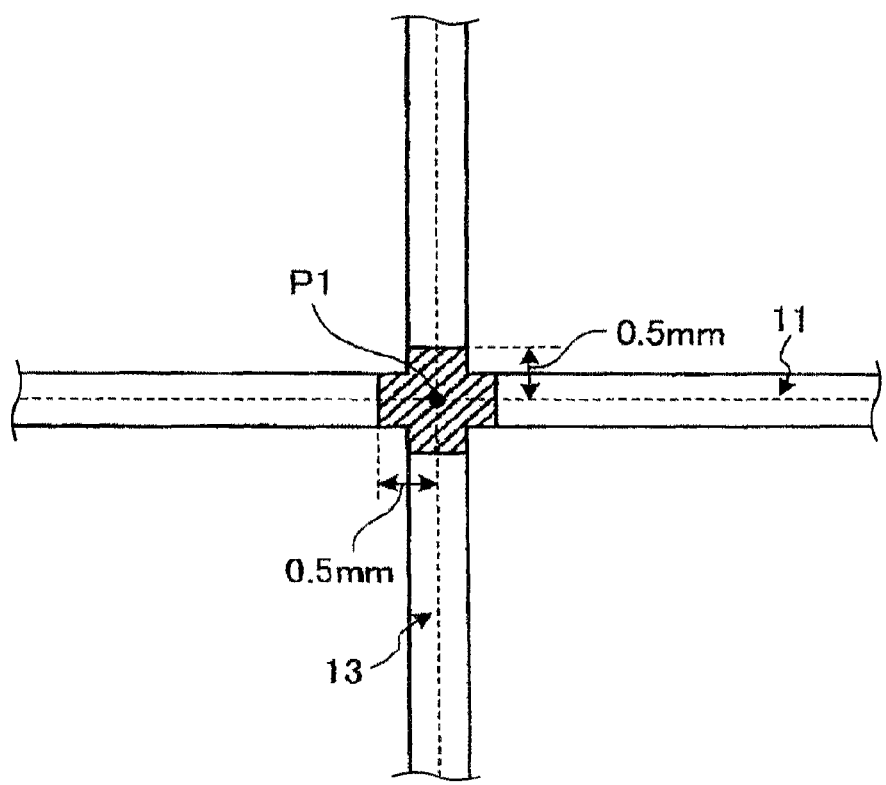
FIG. 9 is a plan view for illustrating an intersecting region.
Figure 10:
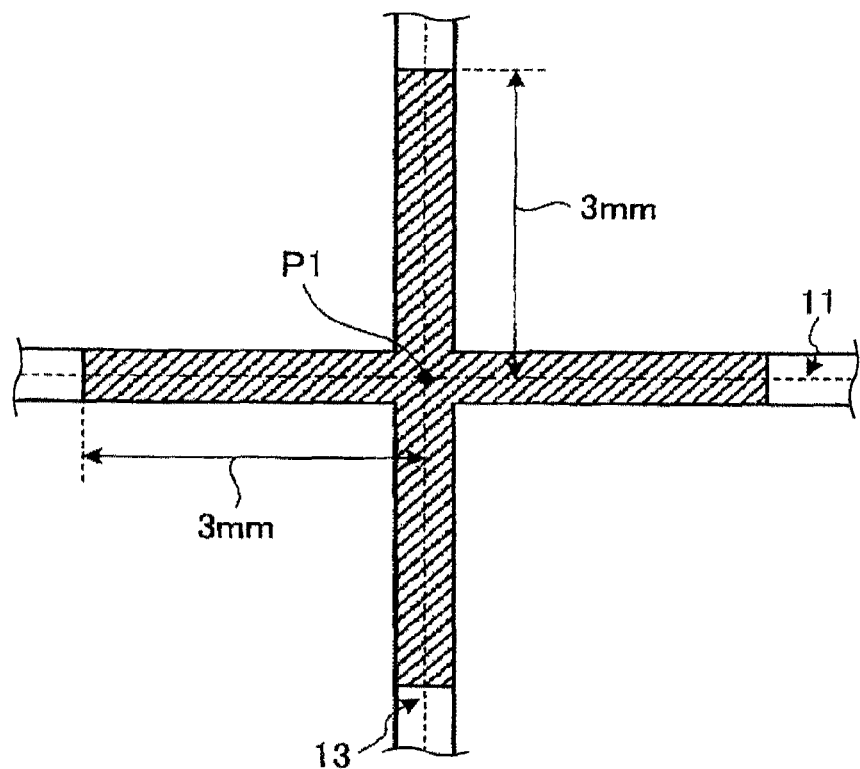
FIG. 10 is a plan view for illustrating another intersecting region.

The range of each intersecting region is set so that the length from the point of intersection is preferably 0.5 to 3 mm, more preferably 0.5 to 1 mm. FIGS. 9 and 10 illustrate the intersecting region between each first division line 11 and each second division line 13. More specifically, FIG. 9 shows the intersecting region in the case that the length from the point of intersection P1 is 0.5 mm, wherein the intersecting region is hatched. As shown in FIG. 9, the intersecting region has a horizontal range on each first division line 11 and a vertical range on each second division line 13, wherein the horizontal range has a length of 0.5 mm from the point of intersection P1 and a total length of 1 mm about the point of intersection P1, and the vertical range also has a length of 0.5 mm from the point of intersection P1 and a total length of 1 mm about the point of intersection P1. As described later, the second modified regions may be formed along either the first division lines 11 or the second division lines 13. For example, in the case that the second modified regions are formed along only the first division lines 11, the intersecting region has only the horizontal range on each first division line 11, wherein the horizontal range has a length of 0.5 mm from the point of intersection P1 and a total length of 1 mm about the point of intersection P1.

On the other hand, FIG. 10 shows the intersecting region in the case that the length from the point of intersection P1 is 3 mm, wherein the intersecting region is hatched. As shown in FIG. 10, the intersecting region has a horizontal range on each first division line 11 and a vertical range on each second division line 13, wherein the horizontal range has a length of 3 mm from the point of intersection P1 and a total length of 6 mm about the point of intersection P1, and the vertical range also has a length of 3 mm from the point of intersection P1 and a total length of 6 mm about the point of intersection P1. Although not shown, in the case that the length from the point of intersection P1 is 1 mm, the intersecting region has a horizontal range on each first division line 11 and a vertical range on each second division line 13, wherein the horizontal range has a length of 1 mm from the point of intersection P1 and a total length of 2 mm about the point of intersection P1, and the vertical range has a length of 1 mm from the point of intersection P1 and a total length of 2 mm about the point of intersection P1.

Thereafter, the holding means 21 is indexed in the Y coordinate direction to align the transversely central position on the next target first division line 11 adjacent to the previous first division line 11 to the position directly below the focusing means 234, and the pulsed laser beam is similarly applied along this target first division line 11 to the intersecting regions between this target first division line 11 and the second division lines 13, thereby forming a plurality of second modified regions 113 at these intersecting regions. In this manner, a plurality of second modified regions 113 are formed along all of the first division lines 11 at all of the intersecting regions between the first division lines 11 and the second division lines 13. Thereafter, the holding means 21 is rotated 90° to change the orientation of the workpiece 1 so that the second division lines 13 extend in the X coordinate direction. In this condition, alignment is performed as in the case of the first division lines 11. Thereafter, the transversely central position on each second division line 13 is aligned to the position directly below the focusing means 234, and the pulsed laser beam is similarly applied along each second division line 13 at all of the intersecting regions between the first division lines 11 and the second division lines 13 to form a plurality of second modified regions 133 along all of the second division lines 13 at all of the intersecting regions. As a result, as shown by double dot & dash lines in FIG. 8, the second modified regions 113 and 133 are so formed as to cross each other at the intersecting regions between the first division lines 11 and the second division lines 13 at the predetermined position inside the workpiece 1 between the back side of the workpiece 1 and the first modified regions 111 and 131.

In this preferred embodiment, the first modified regions are first formed along the first division lines 11 and the second division lines 13, and the second modified regions are next formed along the first division lines 11 and the second division lines 13. As a modification, the first modified region and the second modified regions may be sequentially formed along each of the division lines 11 and 13. That is, the focal position of the pulsed laser beam is adjusted to the first forming position to form the first modified region along a target one of the division lines 11 and 13, and the focal position is next adjusted to the second forming position to form the second modified regions along this target line. This step is repeated for all of the first division lines 11 and the second division lines 13.

Figure 11:
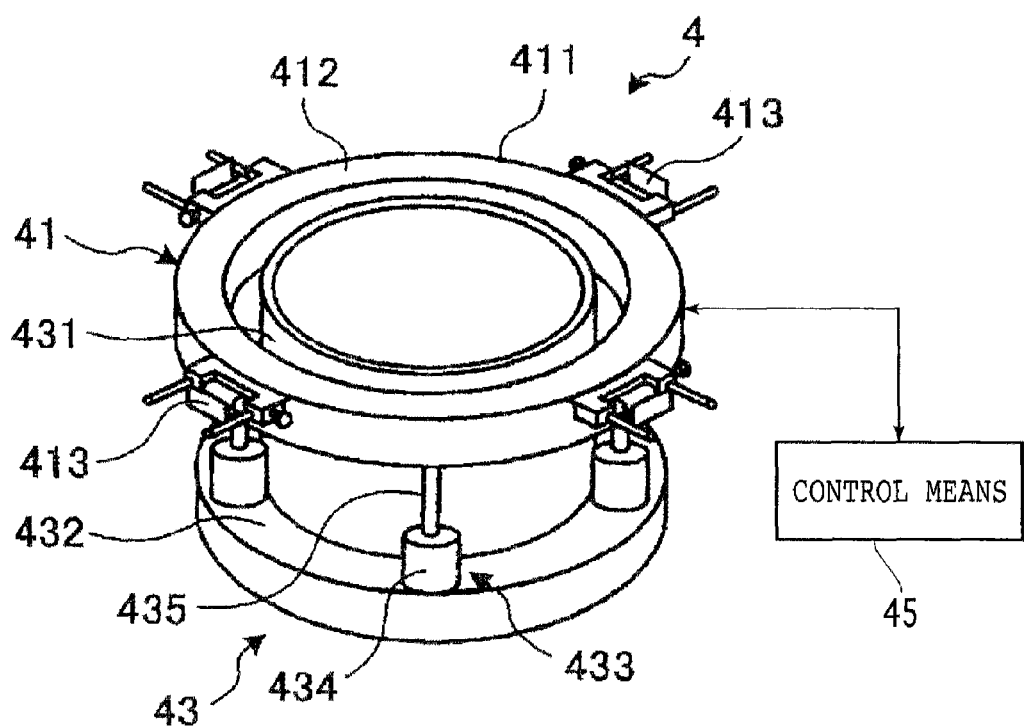
FIG. 11 is a schematic perspective view for illustrating the configuration of a dividing apparatus according to the first preferred embodiment.

The dividing step will now be described. This dividing step is performed by a dividing apparatus for forcibly expanding the protective tape 173 attached to the front side of the workpiece 1 to thereby apply an external force to the workpiece 1, thereby dividing the workpiece 1 along the division lines 11 and 13 to obtain the individual chips. The configuration of this dividing apparatus will now be described. FIG. 11 is a schematic perspective view for illustrating the configuration of a dividing apparatus 4 according to the first preferred embodiment. As shown in FIG. 11, the dividing apparatus 4 includes frame holding means 41, tape expanding means 43, and control means 45 for controlling the operation of the frame holding means 41 and the tape expanding means 43.

The frame holding means 41 functions to hold the annular frame 171 supporting the workpiece 1 as shown in FIG. 1. The frame holding means 41 includes an annular frame holding member 411 and a plurality of clamp mechanisms 413 provided on the outer circumference of the frame holding member 411. The frame holding member 411 has a mounting surface 412 for mounting the annular frame 171 thereon. The clamp mechanisms 413 function to fix the annular frame 171 mounted on the mounting surface 412 to the frame holding member 411. The frame holding means 41 is supported by the tape expanding means 43 so as to be vertically movable.

The tape expanding means 43 functions to expand the protective tape 173 supported to the annular frame 171 held by the frame holding means 41. The tape expanding means 43 includes an expanding drum 431 provided inside of the frame holding member 411 and supporting means 433 for vertically movably supporting the frame holding member 411. The expanding drum 431 has an outer diameter smaller than the inner diameter of the annular frame 171 and an inner diameter larger than the outer diameter of the workpiece 1. The expanding drum 431 has a supporting flange 432 at the lower end. The supporting means 433 is composed of a plurality of air cylinders 434 provided on the supporting flange 432. Each air cylinder 434 is provided with a piston rod 435 connected to the lower surface of the frame holding member 411. The supporting means 433 is controlled by the control means 45 to vertically move the frame holding member 411 between a reference position where the mounting surface 412 is substantially equal in height to the upper end of the expanding drum 431 and an expansion position where the mounting surface 412 is lower in height than the upper end of the expanding drum 431 by a predetermined amount.

The control means 45 is provided by a microcomputer including a memory storing various data required for the operation of the dividing apparatus 4. The control means 45 controls the operation of various components of the dividing apparatus 4 to centrally control the dividing apparatus 4. More specifically, the control means 45 controls the operation of each component of the dividing apparatus 4 to perform the dividing step.

<Dividing Step>

Figure 12A:
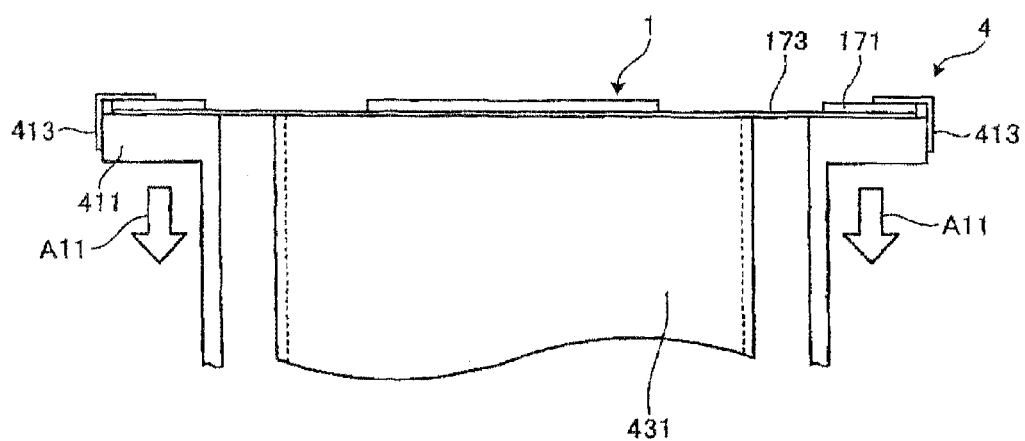
FIGS. 12A and 12B are sectional side views for illustrating a dividing step according to the first preferred embodiment.
Figure 12B:
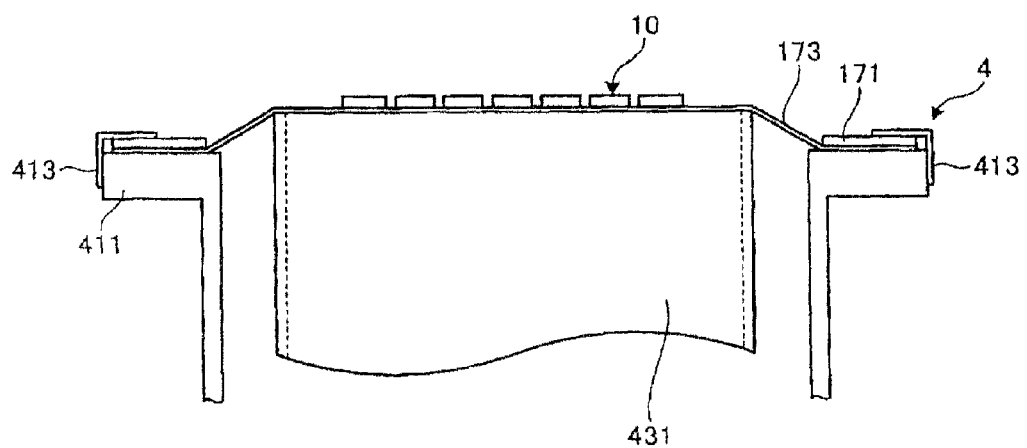
Figure 13:
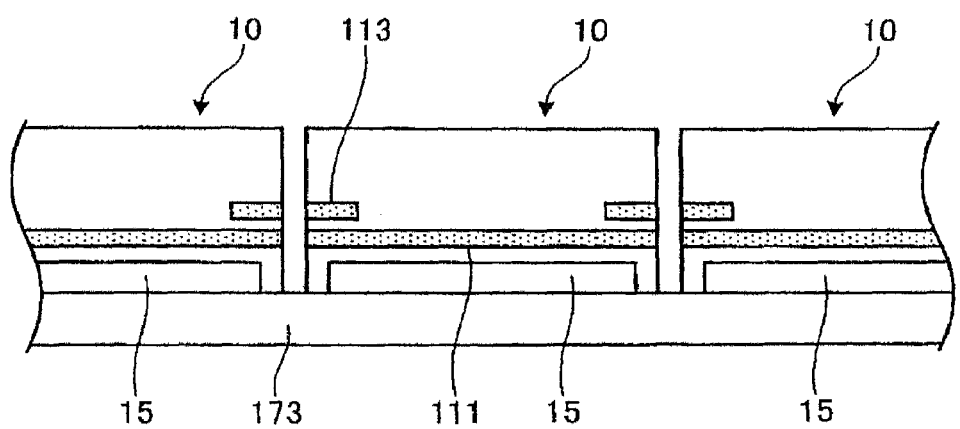
FIG. 13 is an enlarged sectional view showing individual chips obtained by the dividing step according to the first preferred embodiment.

FIGS. 12A to 13 illustrate the dividing step according to the first preferred embodiment performed by using the dividing apparatus 4 mentioned above. More specifically, FIGS. 12A and 12B are sectional side views for illustrating the dividing step, and FIG. 13 is an enlarged sectional view showing individual chips 10 divided from the workpiece 1.

As shown in FIG. 12A, the annular frame 171 supporting the workpiece 1 through the protective tape 173 is mounted on the mounting surface 412 (see FIG. 11) of the frame holding member 411 and fixed to the frame holding member 411 by the clamp mechanisms 413. Accordingly, the workpiece 1 having the first modified regions along the division lines 11 and 13 and also having the second modified regions at the intersecting regions between the division lines 11 and 13 is located just above the expanding drum 431. At this time, the frame holding member 411 is set at the reference position.

After fixing the annular frame 171 to the frame holding member 411 as mentioned above, the air cylinders 434 are driven to lower the frame holding member 411 as shown by an arrow A11 in FIG. 12A. Accordingly, the frame holding member 411 is set at the expansion position as shown in FIG. 12B. At this time, the annular frame 171 fixed to the mounting surface 412 of the frame holding member 411 is also lowered, so that the protective tape 173 supported to the annular frame 171 comes into abutment against the upper end of the expanding drum 431 and is expanded. As a result, a tensile force is radially applied to the workpiece 1 attached to the protective tape 173, and as shown in FIG. 13, the workpiece 1 is broken along the division lines 11 and 13 where the first modified regions 111 and 131 and the second modified regions 113 and 133 are formed to reduce the strength of the workpiece 1, thereby dividing the workpiece 1 into the individual chips 10.

This operation will now be described in more detail. The radial tensile force mentioned above acts on the front side of the workpiece 1 attached to the protective tape 173. The first modified regions 111 and 131 are formed along the first and second division lines 11 and 13, respectively, near the front side of the workpiece 1, that is, near the protective tape 173. Accordingly, when the radial tensile force is applied to the workpiece 1, the workpiece 1 can be easily divided along the division lines 11 and 13 to obtain the individual chips 10. Further, the workpiece 1 can be divided accurately by breaking the workpiece 1 along the division lines 11 and 13. Further, the break starting from the first modified regions 111 and 131 does not propagate to the functional devices 15, so that the damage to the functional devices 15 can be prevented to suppress a reduction in yield.

Further, at the intersecting regions between the first division lines 11 and the second division lines 13, the second modified regions 113 and 133 are formed in addition to the first modified regions 111 and 131. Accordingly, the workpiece 1 can be broken more easily along the division lines 11 and 13, and oblique breaking of the workpiece 1 on the back side thereof can be prevented.

Second Preferred Embodiment

In the first preferred embodiment mentioned above, the workpiece 1 is held by the holding means 21 in the processing apparatus 2 in the condition where the back side of the workpiece 1 is exposed, and the pulsed laser beam is applied to the back side of the workpiece 1 to thereby form the first modified regions and the second modified regions in the workpiece 1. In contrast thereto, according to the second preferred embodiment, a workpiece 1a (see FIG. 14) is held by the holding means 21 in the condition where the front side of the workpiece 1a is exposed, and the pulsed laser beam is applied to the front side of the workpiece 1a. The side of the workpiece 1a to which the pulsed laser beam is applied is not especially limited, but a modified region may be first formed in the workpiece 1a at a position farther from the side of the workpiece 1a to which the pulsed laser beam is applied. The second preferred embodiment will now be described in more detail.

Figure 14:
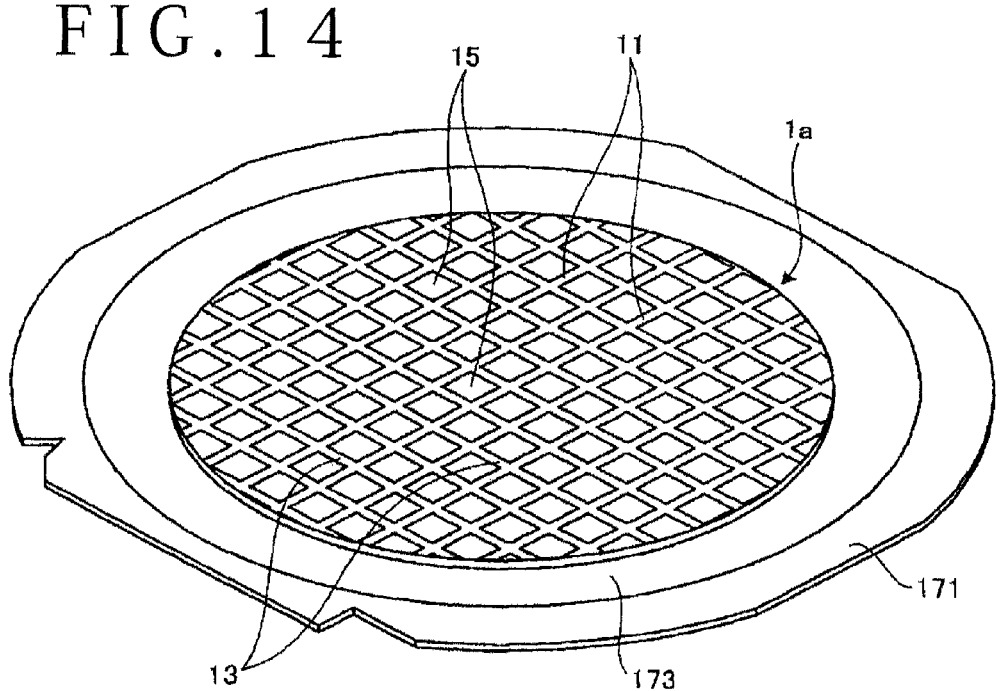
FIG. 14 is a perspective view of a workpiece according to a second preferred embodiment of the present invention.
Figure 15:
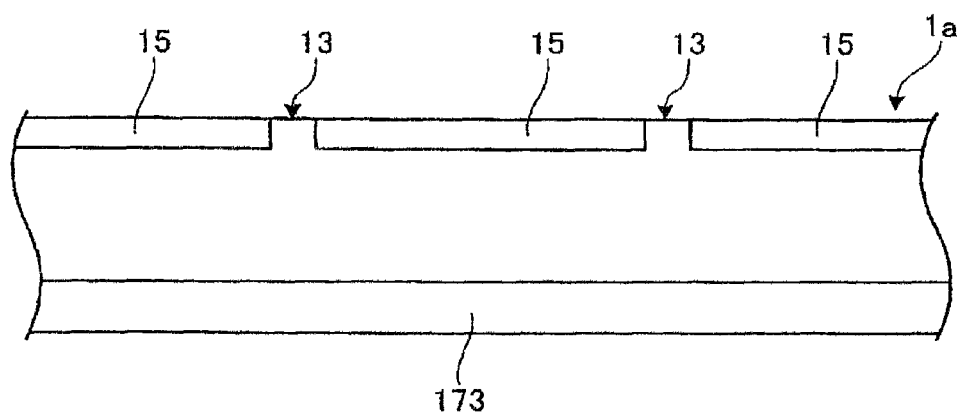
FIG. 15 is a sectional view showing the internal structure of the workpiece according to the second preferred embodiment.

FIG. 14 is a perspective view of the workpiece 1a according to the second preferred embodiment, and FIG. 15 is a sectional view showing the internal structure of the workpiece 1a according to the second preferred embodiment. As shown in FIG. 14, the workpiece 1a is similar to the workpiece 1 according to the first preferred embodiment. That is, the front side of the workpiece 1a (the upper side as viewed in FIG. 14) is formed with a plurality of first division lines 11 and a plurality of second division lines 13 intersecting the first division lines 11 at right angles thereto, thereby partitioning a plurality of rectangular regions where a plurality of functional devices 15 are respectively formed. A protective tape 173 is supported at its outer circumferential portion to an annular frame 171 so as to close the inner opening of the annular frame 171, and the workpiece 1a is supported through the protective tape 173 to the annular frame 171 in the condition where the back side of the workpiece 1a is attached to the upper surface (adhesive surface) of the protective tape 173.

Figure 16:
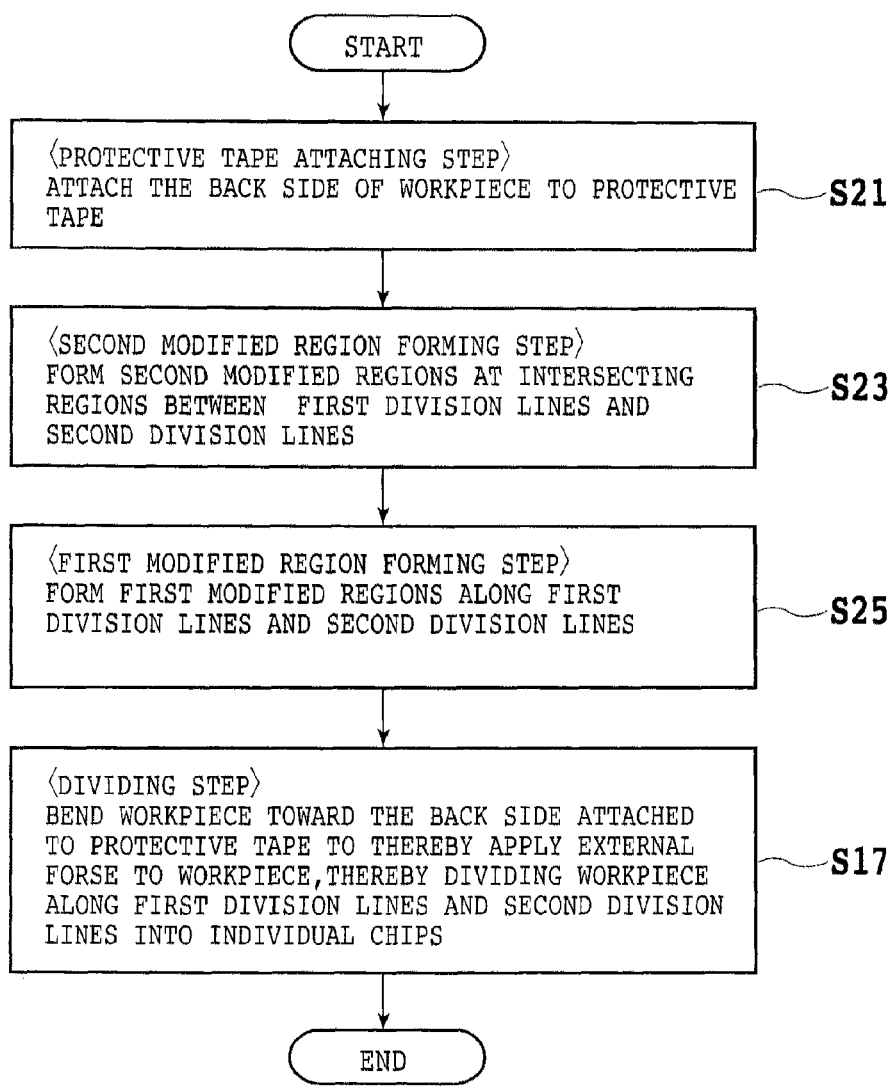
FIG. 16 is a flowchart showing the procedure of a processing method according to the second preferred embodiment.

The processing method for laser-processing the workpiece 1a will now be described. FIG. 16 is a flowchart showing the procedure of the processing method according to the second preferred embodiment. As shown in FIG. 16, a protective tape attaching step is first performed to attach the back side of the workpiece 1a to the protective tape 173 supported at its outer circumferential portion to the annular frame 171 so as to close the inner opening of the annular frame 171 as shown in FIG. 14 (step S21). Thereafter, a second modified region forming step is performed to form a plurality of second modified regions near the points of intersection of the division lines 11 and 13 (at the intersecting regions between the division lines 11 and 13) (step S23). Thereafter, a first modified region forming step is performed to form a plurality of first modified regions along the division lines 11 and 13 (step S25). Thereafter, a dividing step is performed to bend the workpiece 1a toward the back side attached to the protective tape 173, thereby applying an external force to the workpiece 1a to divide the workpiece 1a into individual chips along the division lines 11 and 13 where the strength has been reduced by the formation of the first modified regions and the second modified regions (step S27).

The second modified region forming step, the first modified region forming step, and the dividing step respectively corresponding to steps S23, S25, and S27 will now be described in this order. First, the second modified region forming step and the first modified region forming step will be described. These steps are performed by the processing apparatus 2 shown in FIG. 4. However, in the second preferred embodiment, the workpiece 1a is supported through the protective tape 173 to the annular frame 171 in the condition where the back side of the workpiece 1a is attached to the protective tape 173 as shown in FIG. 14. Accordingly, the workpiece 1a is carried to the holding means 21 and held on the holding surface 211 in the condition where the front side of the workpiece 1a is exposed. Further, a pulsed laser beam is applied by the laser applying unit 233 to the front side of the workpiece 1a held on the holding surface 211. Since the front side of the workpiece 1a held on the holding surface 211 is exposed, the camera constituting the imaging unit 235 for performing the alignment is not required to be an infrared camera, but a visible light camera may be used.

<Second Modified Region Forming Step>

Figure 17:
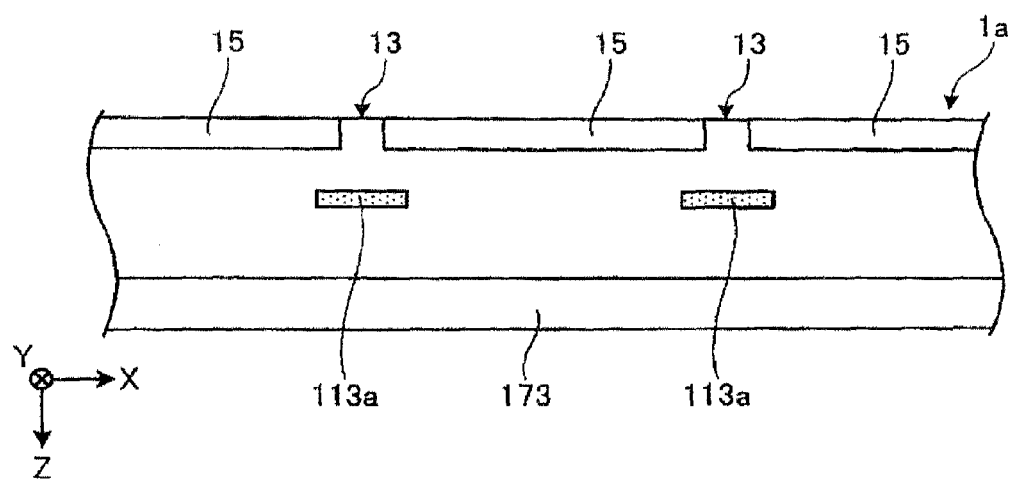
FIG. 17 is a sectional view for illustrating a second modified region forming step according to the second preferred embodiment.

FIG. 17 illustrates the second modified region forming step according to the second preferred embodiment. More specifically, FIG. 17 is a sectional view as viewed in the Y coordinate direction, showing the internal structure of the workpiece 1a held on the holding surface 211 after performing the second modified region forming step. Prior to performing the second modified region forming step, the workpiece 1a is carried to the holding means 21 by carrying means (not shown) and is next held on the holding surface 211 under suction. Thereafter, the workpiece 1a held on the holding surface 211 is imaged by the imaging unit 235 to perform the alignment. Thereafter, the transversely central position on the target first division line 11 is aligned to the position directly below the focusing means 234.

After aligning the transversely central position on the target first division line 11 to the position directly below the focusing means 234 as mentioned above, the processing apparatus 2 operates to form a plurality of second modified regions 113a along this target first division line 11. These plural second modified regions 113a are formed at the intersecting regions between this target first division line 11 and the second division lines 13 at a predetermined position in the workpiece 1a below a first modified region to be formed later in the subsequent first modified region forming step (toward the back side of the workpiece 1a). This predetermined position at the intersecting regions will be hereinafter referred to as "second forming position." First, the supporting member 231 is moved to a predetermined Z position so that the focal position of the pulsed laser beam coincides with the second forming position to thereby adjust the focal point of the focusing lens of the focusing means 234 to the second forming position inside the workpiece 1a. In this condition, the laser applying unit 233 is operated to apply the pulsed laser beam to the intersecting regions between the target first division line 11 and the second division lines 13 as moving the holding means 21 in the X coordinate direction. As a result, the pulsed laser beam is focused at the second forming position to form the second modified regions 113a along the target first division line 11 at the intersecting regions between the target first division line 11 and the second division lines 13 at the predetermined position between the back side of the workpiece 1a and the first modified region to be formed later in the first modified region forming step.

Thereafter, the holding means 21 is indexed in the Y coordinate direction to align the transversely central position on the next target first division line 11 adjacent to the previous first division line 11 to the position directly below the focusing means 234, and the pulsed laser beam is similarly applied along this target first division line 11 to form a plurality of second modified regions 113a at the intersecting regions between this target first division line 11 and the second division lines 13. In this manner, a plurality of second modified regions 113a are formed at all of the intersecting regions between the first division lines 11 and the second division lines 13. Thereafter, the holding means 21 is rotated 90° to change the orientation of the workpiece 1a so that the second division lines 13 extend in the X coordinate direction. In this condition, the transversely central position on each second division line 13 is aligned to the position directly below the focusing means 234, and the pulsed laser beam is similarly applied along each second division line 13 to form a plurality of second modified regions along all of the second division lines 13 at all of the intersecting regions between the first division lines 11 and the second division lines 13. As a result, the second modified regions are so formed as to cross each other at the intersecting regions between the first division lines 11 and the second division lines 13 at the predetermined positions inside the workpiece 1a between the back side of the workpiece 1a and the first modified regions to be formed later in the first modified region forming step.

<First Modified Region Forming Step>

Figure 18:
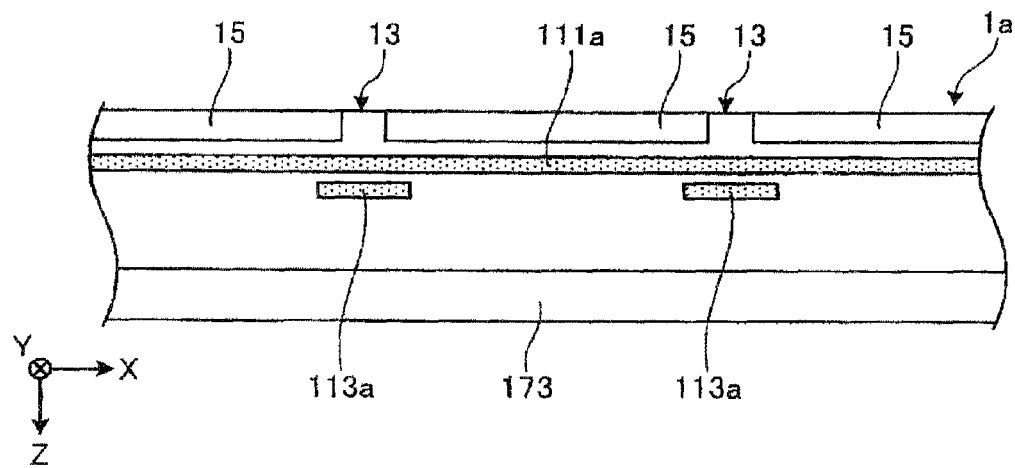
FIG. 18 is a sectional view for illustrating a first modified region forming step according to the second preferred embodiment.

FIG. 18 illustrates the first modified region forming step according to the second preferred embodiment. More specifically, FIG. 18 is a sectional view as viewed in the Y coordinate direction, showing the internal structure of the workpiece 1a held on the holding surface 211 after performing the first modified region forming step. The processing apparatus 2 performs alignment to align the transversely central position on the target first division line 11 to the position directly below the focusing means 234. Thereafter, the processing apparatus 2 operates as the first modified region forming step to form a first modified region 111a along this target first division line 11 as shown in FIG. 18.

The first modified region 111a is formed at a predetermined position in the workpiece 1a near the front side thereof (near the front side of the workpiece 1a where the functional devices 15 are formed) above the second modified regions 113a (toward the front side of the workpiece 1a). This predetermined position near the front side of the workpiece 1a will be hereinafter referred to as "first forming position." First, the supporting member 231 is moved by the processing apparatus 2 to a predetermined Z position so that the focal position of the pulsed laser beam coincides with the first forming position to thereby adjust the focal point of the focusing lens of the focusing means 234 to the first forming position inside the workpiece 1a. In this condition, the laser applying unit 233 is operated to apply the pulsed laser beam to the workpiece 1a as moving the holding means 21 in the X coordinate direction. As a result, the pulsed laser beam is focused at the first forming position to form the first modified region 111a along the target first division line 11 inside the workpiece 1a near the front side thereof where the functional devices 15 are formed and above the second modified regions 113a.

Thereafter, the holding means 21 is indexed in the Y coordinate direction to align the transversely central position on the next target first division line 11 adjacent to the previous first division line 11 to the position directly below the focusing means 234, and the pulsed laser beam is similarly applied along this target first division line 11 to form another first modified region 111a. In this manner, a plurality of first modified regions 111a are formed along all of the first division lines 11. Thereafter, the holding means 21 is rotated 90° to change the orientation of the workpiece 1a so that the second division lines 13 extend in the X coordinate direction. In this condition, the transversely central position on each second division line 13 is aligned to the position directly below the focusing means 234, and the pulsed laser beam is similarly applied along each second division line 13 to form a plurality of first modified regions along all of the second division lines 13. As a result, the first modified regions are formed along the first division lines 11 and the second division lines 13 near the front side of the workpiece 1a where the functional devices 15 are formed and above the second modified regions.

As in the first preferred embodiment, the second modified regions and the first modified region may be sequentially formed along each of the division lines 11 and 13. That is, the focal position of the pulsed laser beam is adjusted to the second forming position to form the second modified regions along a target one of the division lines 11 and 13, and the focal position is next adjusted to the first forming position to form the first modified region along this target line. This step may be repeated for all of the division lines 11 and 13.

The dividing step will now be described. This dividing step is performed by a dividing apparatus for bending the workpiece 1a toward the back side attached to the protective tape 173 to thereby apply an external force to the workpiece 1a, thereby dividing the workpiece 1a along the division lines 11 and 13 to obtain the individual chips.

Figure 19:
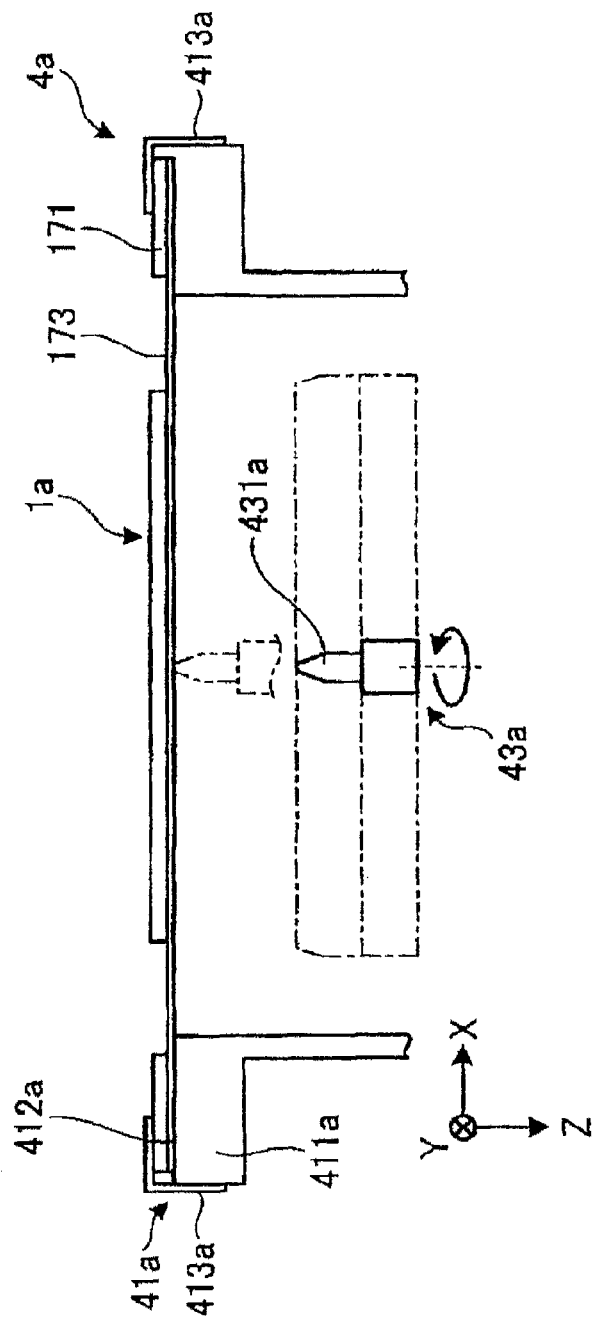
FIG. 19 is a schematic side view for illustrating the configuration of a dividing apparatus according to the second preferred embodiment.

The configuration of this dividing apparatus will now be described. FIG. 19 is a schematic side view for illustrating the configuration of a dividing apparatus 4a according to the second preferred embodiment. As shown in FIG. 19, the dividing apparatus 4a includes frame holding means 41a and tape pushing means 43a. Although not shown, the dividing apparatus 4a further includes control means for controlling the operation of the frame holding means 41a and the tape pushing means 43a.

The frame holding means 41a functions to hold the annular frame 171 supporting the workpiece 1a as shown in FIG. 14. The frame holding means 41a includes an annular frame holding member 411a and a plurality of clamp mechanisms 413a provided on the outer circumference of the frame holding member 411a. The frame holding member 411a has a mounting surface 412a for mounting the annular frame 171. The mounting surface 412a is parallel to an XY coordinate plane. The clamp mechanisms 413a function to fix the annular frame 171 mounted on the mounting surface 412a to the frame holding member 411a. More specifically, the annular frame 171 is mounted on the mounting surface 412a and fixed by the clamp mechanisms 413a in the condition that the first division lines 11 of the workpiece 1a extend in the X coordinate direction and the second division lines 13 of the workpiece 1a extend in the Y coordinate direction.

The tape pushing means 43a functions to push the workpiece 1a supported to the annular frame 171 held by the frame holding means 41a, from the protective tape 173 side, thereby bending the workpiece 1a toward the protective tape 173. The tape pushing means 43a includes a spatula-shaped push member 431a having an upper edge as a linear push edge. The length of this linear push edge is set equal to or greater than the diameter of the workpiece 1a.

The tape pushing means 43a having the push member 431a is rotatable about a vertical axis passing through the longitudinal center of the push edge by rotationally driving means (not shown), thereby selectively taking a first rotational position where the push edge extends in the X coordinate direction as shown by a single dot and dash line in FIG. 19 and a second rotational position where the push edge extends in the Y coordinate direction as shown by a solid line in FIG. 19. The tape pushing means 43a is also movable in the vertical direction (Z coordinate direction) by driving means (not shown), thereby selectively taking a lower position as a retracted position shown by the solid line in FIG. 19 and an upper position as a push position where the push edge abuts against the protective tape 173 to push the workpiece 1a from the back side thereof as shown by a double dot and dash line in FIG. 19. The tape pushing means 43a is also movable in the X coordinate direction and the Y coordinate direction by driving means (not shown). Accordingly, the tape pushing means 43a having the first rotational position can be moved to a predetermined Y position so that the push edge is opposed to a target one of the first division lines 11 of the workpiece 1a, whereas the tape pushing means 43a having the second rotational position can be moved to a predetermined X position so that the push edge is opposed to a target one of the second division lines 13 of the workpiece 1a located above.

While the tape pushing means 43a includes the spatula-shaped push member 431a adapted to push the protective tape 173 along the division lines 11 and 13 in this preferred embodiment, the tape pushing means 43a may include a roller adapted to roll on the protective tape 173 along the division lines 11 and 13.

<Dividing Step>

In the dividing step according to the second preferred embodiment carried out by the dividing apparatus 4a, the annular frame 171 is mounted on the mounting surface 412a of the frame holding member 411a and fixed to the frame holding member 411a by the clamp mechanisms 413a. At this time, the tape pushing means 43a is set at the retracted position and also set at the first rotational position where the push edge of the push member 431a extends in the X coordinate direction.

Thereafter, the tape pushing means 43a is moved in the Y coordinate direction so that the push edge is opposed to the target first division line 11. The tape pushing means 43a is next lifted from the retracted position to the push position to push the protective tape 173 along this target first division line 11, thereby bending the workpiece 1a toward the protective tape 173. After repeating this operation to bend the workpiece 1a toward the protective tape 173 along all of the first division lines 11, the tape pushing means 43a is rotated to take the second rotational position where the push edge extends in the Y coordinate direction. Thereafter, the tape pushing means 43a is moved in the X coordinate direction so that the push edge is opposed to the target second division line 13. The tape pushing means 43a is next lifted from the retracted position to the push position to push the protective tape 173 along this target second division line 13, thereby bending the workpiece 1a toward the protective tape 173.

Figure 20:
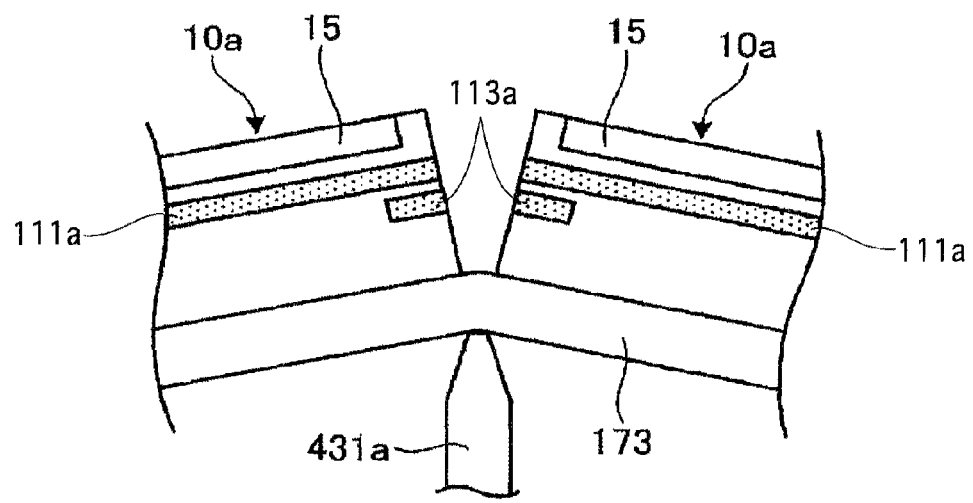
FIG. 20 is an enlarged sectional view for illustrating a dividing step according to the second preferred embodiment.

FIG. 20 is an enlarged sectional view for illustrating the dividing step according to the second preferred embodiment, wherein the workpiece 1a is bent toward the protective tape 173 along the target second division line 13. As shown in FIG. 20, the push edge of the push member 431a abuts against the protective tape 173 so as to extend along the target second division line 13 and then pushes the workpiece 1a from the protective tape 173 side, thereby bending the workpiece 1a toward the protective tape 173 along the target second division line 13.

As a result, the workpiece 1a is broken along the division lines 11 and 13 where the first modified regions and the second modified regions are formed to reduce the strength of the workpiece 1a, thereby dividing the workpiece 1a into individual chips 10a. This operation will now be described in more detail. The workpiece 1a is pushed from the back side attached to the protective tape 173 and is bent toward the back side by the dividing apparatus 4a according to the second preferred embodiment. Accordingly, stress is generated on the front side of the workpiece 1a in bending the workpiece 1a. However, the first modified regions are formed along the division lines 11 and 13 near the front side of the workpiece 1a where stress is generated. Therefore, according to the preferred second embodiment, the workpiece 1a can be easily divided along the division lines 11 and 13 to obtain the individual chips 10a. Further, the workpiece 1a can be divided accurately by breaking the workpiece 1a along the division lines 11 and 13. Further, the break starting from the first modified regions does not propagate to the functional devices 15, so that the damage to the functional devices 15 can be prevented to suppress a reduction in yield.

In the first and second preferred embodiments mentioned above, the protective tape attaching step is first performed. In the first preferred embodiment, the front side of the workpiece 1 is attached to the protective tape 173, whereas in the second preferred embodiment, the back side of the workpiece 1a is attached to the protective tape 173. As a modification, the protective tape attaching step may be performed before the dividing step. That is, it is not necessarily required to attach the protective tape 173 to the front side or back side of the workpiece before the first modified region forming step and the second modified region forming step, but the protective tape attaching step may be performed before the dividing step to attach the protective tape to the front side or back side of the workpiece.

Further, in the first preferred embodiment, the pulsed laser beam is applied to the back side of the workpiece 1 to form the first modified regions and the second modified regions in the workpiece 1, and the protective tape 173 attached to the front side of the workpiece 1 is next expanded to thereby divide the workpiece 1 into the individual chips 10. On the other hand, in the second preferred embodiment, the pulsed laser beam is applied to the front side of the workpiece 1a to form the second modified regions and the first modified regions in the workpiece 1a, and the workpiece 1a is next bent toward the protective tape 173 attached to the back side of the workpiece 1a to thereby divide the workpiece 1a into the individual chips 10a.

As a modification, the first modified region forming step and the second modified region forming step may be performed as in the first preferred embodiment and the dividing step may be performed as in the second preferred embodiment. More specifically, the pulsed laser beam is applied to the back side of the workpiece to form the first modified regions and the second modified regions in the workpiece as in the first preferred embodiment. Thereafter, the protective tape attached to the front side of the workpiece is removed and next reattached to the back side of the workpiece. As another modification, the first modified region forming step and the second modified region forming step may be performed without attaching the protective tape to the front side of the workpiece. In this case, the pulsed laser beam is applied to the back side of the workpiece to form the first modified regions and the second modified regions in the workpiece as in the first preferred embodiment, and the protective tape is next attached to the back side of the workpiece. Thereafter, the workpiece is bent toward the protective tape attached to the back side of the workpiece as in the second preferred embodiment to thereby divide the workpiece into the individual chips.

As a modification, the first modified region forming step and the second modified region forming step may be performed as in the second preferred embodiment, and the dividing step may be performed as in the first preferred embodiment. More specifically, the pulsed laser beam is applied to the front side of the workpiece to form the second modified regions and the first modified regions in the workpiece as in the second preferred embodiment. Thereafter, the protective tape attached to the back side of the workpiece is removed and next reattached to the front side of the workpiece. As another modification, the second modified region forming step and the first modified region forming step may be performed without attaching the protective tape to the back side of the workpiece. In this case, the pulsed laser beam is applied to the front side of the workpiece to form the second modified regions and the first modified regions in the workpiece as in the second preferred embodiment, and the protective tape is next attached to the front side of the workpiece. Thereafter, the protective tape attached to the front side of the workpiece is expanded as in the first preferred embodiment to thereby divide the workpiece into the individual chips.

Further, in the first and second preferred embodiment, the second modified regions are formed along both the division lines 11 and 13 at the intersecting regions therebetween. As a modification, the second modified regions may be formed along either the first division lines 11 or the second division lines 13 at the intersecting regions between the division lines 11 and 13. For example, the second modified regions may be formed along the division lines whose pitch is shorter.

Further, in the first and second preferred embodiments, the second modified regions forming a single layer are formed at the predetermined position (the second forming position) between the back side of the workpiece and the first modified regions formed near the front side of the workpiece at the intersecting regions between the first and second division lines. The second forming position is not especially limited provided that it falls between the back side of the workpiece and the first modified regions. Further, the second modified regions may be formed as a plurality of layers layered in the direction of the thickness of the workpiece.

Third Preferred Embodiment

Figure 21:
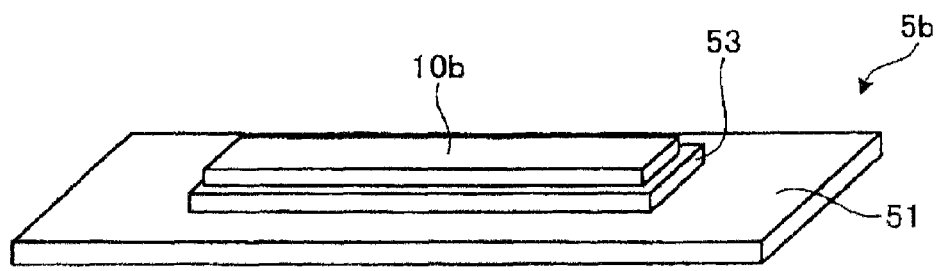
FIG. 21 is a perspective view for illustrating the configuration of a semiconductor device according to a third preferred embodiment of the present invention.

FIG. 21 is a perspective view for illustrating the configuration of a semiconductor device 5*b* according to a third preferred embodiment of the present invention. As shown in FIG. 21, the semiconductor device 5*b* is composed of a glass substrate 51 and a chip 10*b* mounted on the glass substrate 51 through a bonding resin layer 53. The chip 10*b* may be obtained by performing the processing method according to the first preferred embodiment or the second preferred embodiment mentioned above, and corresponds to the chip 10 in the first preferred embodiment or the chip 10*a* in the second preferred embodiment. The bonding resin layer 53 is provided by an anisotropic conductive film (ACF) of epoxy resin, for example, and it functions to electrically and physically connect the glass substrate 51 and the chip 10*b* by thermocompression bonding.

A manufacturing method for this semiconductor device 5*b* will now be described. First, an anisotropic conductive film as the bonding resin film 53 is placed on the glass substrate 51. The chip 10*b* is next placed on the bonding resin film 53 in the condition where the front side of the chip 10*b* formed with the functional devices 15 is oriented downward, that is, the front side is in contact with the bonding resin layer 53. Thereafter, thermocompression bonding is performed to mount the chip 10*b* on the glass substrate 51.

Known as a specific application of the semiconductor device 5*b* is a liquid crystal display configured so that an LCD driver IC is mounted on a glass substrate by using a COG (Chip On Glass) method (see Japanese Patent Laid-open No. 2006-171530, for example). In this case, the functional device 15 is used as an LCD driver device to thereby obtain the chip 10*b* usable as the LCD driver IC. The front side of the chip 10*b* where the functional device 15 is formed is attached through the bonding resin layer 53 to the glass substrate 51, thus mounting the chip 10*b* on the glass substrate 51.

As mentioned above, the front side of the chip 10*b* is attached to the glass substrate 51 to thereby mount the chip 10*b* on the glass substrate 51 according to the third preferred embodiment. The first modified regions are formed along the division lines 11 and 13 near the front side of the workpiece as described in the first and second preferred embodiments. Accordingly, as described later with reference to FIG. 22, first modified regions 111*b* extending along the division lines 11 and 13 are left on the side surfaces of the chip 10*b* near the glass substrate 51. With this structure, no modified regions for attenuating the stress are present near the back side of the chip 10*b* where a tensile stress is generated, so that it is possible to improve the strength of the chip 10*b* such as a drop strength and a three-point die strength (bending strength at one point on the front side and at two points on the back side). In general, the die strength mentioned above is evaluated for an LCD driver IC (silicon chip).

The present inventors tested the strength of the semiconductor device 5*b* manufactured by attaching the front side of the chip 10*b* to the glass substrate 51, wherein the chip 10*b* was obtained by performing the processing method according to the first preferred embodiment or the second preferred embodiment, and the functional device 15 is formed on the front side of the chip 10*b*.

Figure 22:
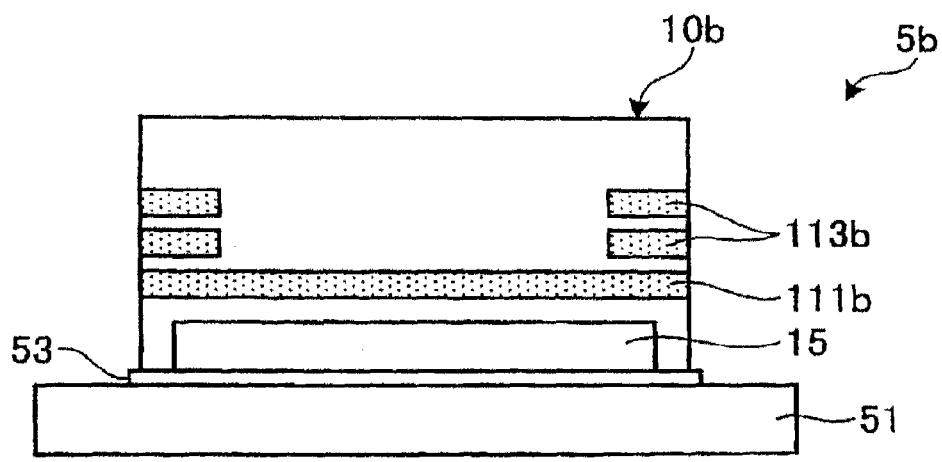
FIG. 22 is a side view showing the semiconductor device according to the third preferred embodiment used in a test for evaluating the strength of the semiconductor device.
Figure 23:
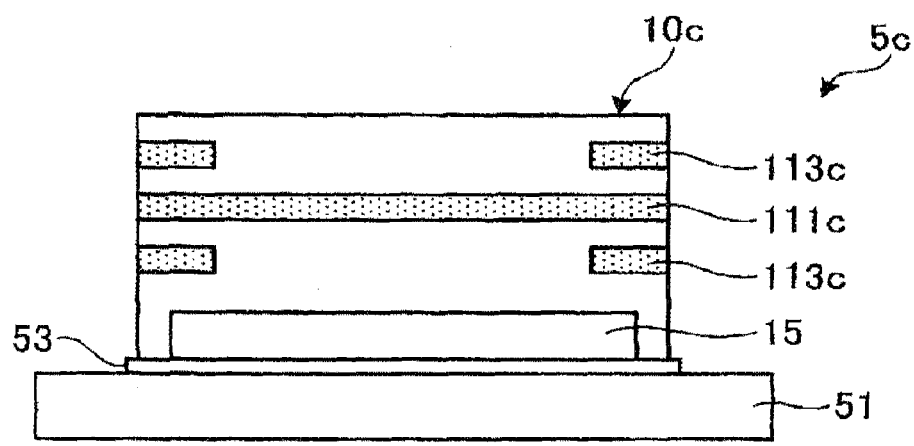
FIG. 23 is a view similar to FIG. 22, showing a comparison.

FIG. 22 is a side view showing an example of the present invention used in the test for evaluating the strength of the semiconductor device 5*b*, and FIG. 23 is a side view showing a comparison. Each semiconductor device in the example and the comparison employed a silicon wafer having a thickness of 200 μm to fabricate a chip having a size of 0.75 mm×20 mm. The thickness of the glass substrate 51 was set to 300 μm.

As shown in FIG. 22, the semiconductor device 5*b* according to the third preferred embodiment of the present invention was fabricated by mounting the chip 10*b* through the bonding resin film 53 on the glass substrate 51, wherein the chip 10*b* was obtained by dividing a workpiece formed with, through a laser processing, first modified regions 111*b* of a single layer near the front side where the functional devices 15 are formed and second modified regions 113*b* of two layers above the first modified regions 111*b*. The first modified regions 111*b* extend along the first division lines 11, and other first modified regions (not shown) extend along the second division lines 13.

In the example shown in FIG. 22, the thickness of each first modified region 111b and the thickness of each second modified region 113b were both set to about 24 μm. The distance from each first modified region 111b to the front side of the chip 10b where the functional device 15 is formed was set to about 25 μm. The length of each second modified region 113b from the point of intersection between the division lines 11 and 13 was set to about 0.5 mm. The second modified regions 113b were formed along only the division lines 11 or 13 whose pitch was shorter.

In the comparison shown in FIG. 23, there is shown a semiconductor device 5c fabricated by mounting a chip 10c through the bonding resin layer 53 on the glass substrate 51, wherein the chip 10c was obtained by dividing a workpiece formed with, through a laser processing, first modified regions 111c of a single layer at a central position in the direction of the thickness of the workpiece and second modified regions 113c of two layers above and below the first modified regions 111c. The first modified regions 111c extend along the first division lines 11, and other first modified regions (not shown) extend along the second division lines 13. In the comparison shown in FIG. 23, the thickness of each first modified region 111c and the thickness of each second modified region 113c were both set to about 32 μm. The distance from each first modified region 111c to the front side of the chip 10c where the functional device 15 is formed was set to about 83 μm. The length of each second modified region 113c from the point of intersection between the division lines 11 and 13 was set to about 0.5 mm. Also in the comparison, the second modified regions 113c were formed along only the division lines 11 or 13 whose pitch was shorter.

Figure 24:
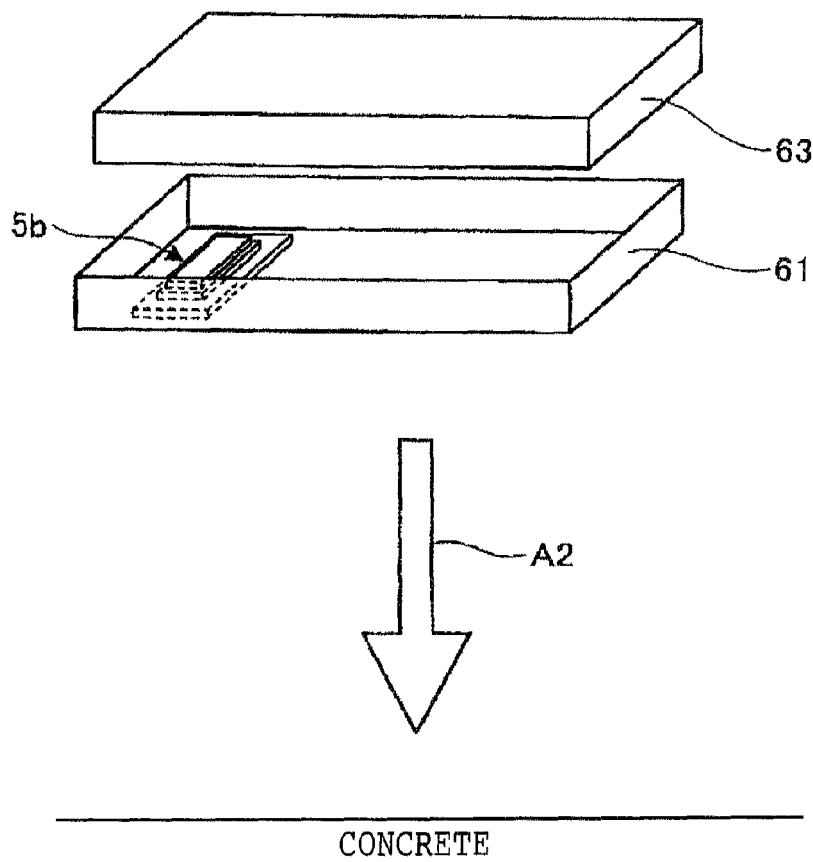
FIG. 24 is a perspective view for illustrating a test method for evaluation of the strength of the semiconductor device.

There will now be described a test method. FIG. 24 is a perspective view for illustrating this test method. As shown in FIG. 24, the semiconductor device 5b as an applied example was fixed to a jig 61 formed of resin, and this jig 61 was covered with a jig 63 formed of aluminum. The assembly of the semiconductor device 5b, the jig 61, and the jig 63 was repeatedly dropped from a height of about 150 cm to a concrete surface as shown by an arrow A2 in FIG. 24 in the condition where the jig 61 was oriented downward, and the number of repetitions of this drop was counted until the semiconductor device 5b was broken. This test was performed for a predetermined number of semiconductor devices 5b. This test was similarly performed for a predetermined number of semiconductor devices 5c as the comparison. The total weight of the jigs 61 and 63 was 90 g.

FIG. 25 is a table showing the result of this test. In this test, the upper limit of the number of drops was set to 30, and the number of drops was classified into "0-10," "11-20," "21-30," and "Not broken." The proportion of the number of semiconductor devices attaining "Not broken" after 30 times of drops was measured. As apparent from FIG. 25, all of the semiconductor devices 5c as the comparison were broken when the number of drops was "0-10." To the contrary, 74% of the semiconductor devices 5b as the example of the present invention were not broken even when the number of drops reached 30.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A processing method for dividing a workpiece along a plurality of first division lines and a plurality of second division lines intersecting said first division lines, the front side of said workpiece being partitioned by said first division lines and said second division lines into a plurality of regions where a plurality of functional devices are respectively formed, said processing method comprising:
    a first modified region forming step of applying a pulsed laser beam having a transmission wavelength to said workpiece along said first division lines and said second division lines to thereby form a plurality of first modified regions in said workpiece near the front side of said workpiece;
    a second modified region forming step of applying said pulsed laser beam to a plurality of intersecting regions between said first division lines and said second division lines to thereby form a plurality of second modified regions at predetermined positions between the back side of said workpiece and said first modified regions formed or to be formed in said workpiece; and
    a dividing step of applying an external force to said workpiece after performing said first modified region forming step and said second modified region forming step to thereby divide said workpiece along said first division lines and said second division lines into a plurality of individual chips.

2. The processing method according to claim 1, further comprising a protective tape attaching step of attaching an expandable protective tape to the front side of said workpiece;
    said dividing step including the step of expanding said protective tape attached to the front side of said workpiece to thereby apply said external force to said workpiece, thus dividing said workpiece along said first division lines and said second division lines.

3. The processing method according to claim 1, further comprising a protective tape attaching step of attaching a protective tape to the back side of said workpiece;
    said dividing step including the step of bending said workpiece toward the back side thereof attached to said protective tape to thereby apply said external force to said workpiece, thus dividing said workpiece along said first division lines and said second division lines.

* * * * *